United States Patent

Owen

Patent Number: 5,530,565
Date of Patent: Jun. 25, 1996

[54] HOLOGRAPHIC TRANSMISSION BANDPASS FILTER

[75] Inventor: Harry Owen, Saline, Mich.

[73] Assignee: Kaiser Optical Systems, Inc., Ann Arbor, Mich.

[21] Appl. No.: 329,399

[22] Filed: Oct. 26, 1994

Related U.S. Application Data

[63] Continuation of Ser. No. 983,055, Nov. 30, 1992, abandoned.

[51] Int. Cl.6 .................................................. G02B 5/32
[52] U.S. Cl. ........................... 359/15; 359/19; 359/566; 359/572; 359/615
[58] Field of Search ................................ 359/15, 19, 565, 359/566, 569, 572, 615

[56] References Cited

U.S. PATENT DOCUMENTS

| | | | |
|---|---|---|---|
| 3,973,850 | 8/1976 | Pouey | 356/100 |
| 4,063,818 | 12/1977 | Lepere | 356/100 |
| 4,068,954 | 1/1978 | Da Silva | 356/100 |
| 4,241,999 | 12/1980 | Pouey | 356/100 |
| 4,264,205 | 4/1981 | Landa | 356/326 |
| 4,455,088 | 6/1984 | Koike | 356/334 |
| 4,669,811 | 6/1987 | McQuoid | 350/3.7 |
| 4,752,130 | 6/1988 | George et al. | 356/334 |
| 4,776,652 | 10/1988 | Ih | 359/19 |
| 4,815,849 | 3/1989 | Sullivan | 356/328 |
| 4,848,863 | 7/1989 | Kramer | 359/615 |
| 5,011,284 | 4/1991 | Tedesco et al. | 356/301 |

*Primary Examiner*—Georgia Y. Epps
*Assistant Examiner*—Michael A. Papalas
*Attorney, Agent, or Firm*—Gifford, Krass, Groh, Sprinkle, Patmore, Anderson & Citkowski

[57] ABSTRACT

A narrow bandwidth bandpass filter having high transmission efficiency for the passband and excellent out-of-band attenuation employs a transmission holographic grating sandwiched between the oblique faces of a pair of right angle glass prisms. An incoming laser beam to be filtered is incident normal to one of the prism faces so as to intersect the holographic grating at about 45°. The grating frequency is such as to diffract light of the transmission wavelength through substantially 90° so that it exits the cube formed by the two prisms from the right angle face of the second prism. The out-of-band wavelengths of the incident beam are either transmitted unaffected through the grating or diffracted at a different angle than the light of the transmission wavelength. A spatial filter comprising a mask with a central aperture is supported a spaced distance from the output face of the cube so that diffracted light of the transmission wavelength passes through the aperture and the unwanted wavelengths, which are diffracted at different angles than the transmission wavelength, are blocked by the mask.

12 Claims, 2 Drawing Sheets

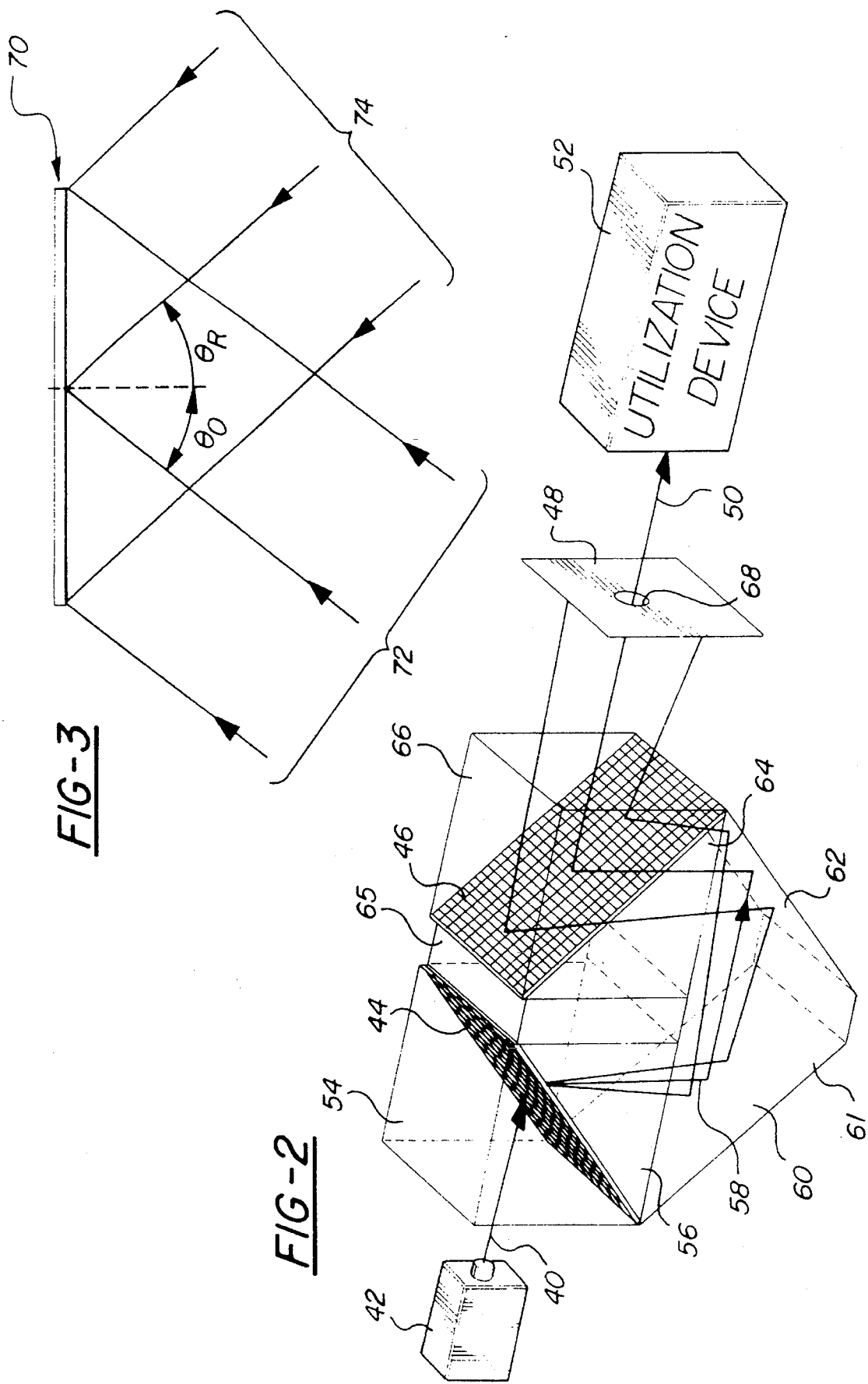

1

HOLOGRAPHIC TRANSMISSION BANDPASS FILTER

This application is a continuation of application Ser. No. 07/983,055, filed Nov. 30, 1992, now abandoned.

FIELD OF THE INVENTION

This invention relates to bandpass filters employing holographic optical elements formed as transmission gratings, and more particularly to a bandpass filter for removing unwanted wavelengths from the output of a laser to produce a beam of high wavelength purity.

BACKGROUND OF THE INVENTION

Bandpass filters are employed in a wide variety of optical systems. Dielectric filters have been widely used because of their relatively low cost and compact construction. However, they typically have a maximum transmission efficiency for the pass wavelength of about 65%. Their pass band is not very sharp, and when sharp edges are required, two dielectric filters are typically used in series, reducing the total throughput to about 42%.

As an alternative, U.S. Pat. No. 4,669,811 discloses the use of a reflective holographic optical element (HOE) associated with a second reflector. Light to be filtered intersects the HOE at an angle so that light of the desired pass wavelength is reflected and the unwanted wavelengths pass through the HOE. The reflected light is returned to the HOE at a slightly different angle by the second reflector to produce an exiting beam. Because of the change in incidence angle, the second reflection by the HOE has a spectral pass band that is shifted relative to the first reflection by the HOE, but a relatively small amount so that the pass bands of the two reflections overlap to achieve a sharper overall pass band. The pass band of the HOE has sidebands, however, that would attenuate but not eliminate some of the undesired wavelengths that are outside the central pass band of the filter.

As another alternative, U.S. Pat. No. 5,124,859 discloses a bandpass filter comprising a container filled with a pressurized gas that has a ground state transition corresponding to the pass wavelength and that is transparent to other wavelengths. This filter concept can work with light incident over a range of angles and is used in a reflection configuration to separate the pass wavelength from other wavelengths. Operation of this filter concept is limited, however, to those wavelengths for which there is a gas with a suitable ground state transition.

SUMMARY OF THE PRESENT INVENTION

The present invention is directed toward a low cost, rugged bandpass filter which receives an incident light beam at an oblique angle so as to diffract light of the desired wavelength through a particular angle and either pass out-of-band light unaffected or diffract that light through different angles. The diffracted light is then filtered by an apertured mask which passes light of the desired wavelength and blocks the other diffracted wavelengths.

In a preferred embodiment of the invention the holographic grating is sandwiched between the oblique faces of a pair of right angle glass prisms to produce a cube. The incident light beam, typically from a laser, is directed normal to a right angle face of one of the prisms so as to intersect the grating at about 45°. The fringes of the grating are constructed so that light of the desired pass wavelength, usually a primary emission line of the laser, is diffracted by about 90° and thus exits the cube normal to a right angle face of the second prism. Unwanted wavelengths either pass through the grating undiffracted or are diffracted at different angles than the light of the pass wavelength. A spatial filter consisting of an apertured mask is supported at a spaced distance from the output face of the cube so that the desired wavelength is passed by the aperture and the undesired diffracted wavelengths are blocked by the mask.

While the glass prisms which support the HOE grating are not essential to the design, they improve the filter efficiency by maximizing the dispersion of light by the grating.

The resulting filter has an extremely high transmission efficiency for the pass wavelengths, a very narrow spectral bandwidth, high out-of-band attenuation and sharp band edges. The device is compact, rugged and relatively low in cost.

BRIEF DESCRIPTION OF THE DRAWINGS

Other objectives, advantages and applications of the present invention will be made apparent by the following detailed description of two embodiments of the invention. The description makes reference to the accompanying drawings in which:

FIG. 2 is a perspective, partially schematic illustration of an alternative embodiment of the invention including a bandpass filter employing two dispersive gratings formed of transmission holographic optical elements; and FIG. 3 illustrates the manner of construction of the transmission HOE diffraction gratings used with the present invention.

DETAILED DESCRIPTION OF THE INVENTION

Figure 1:
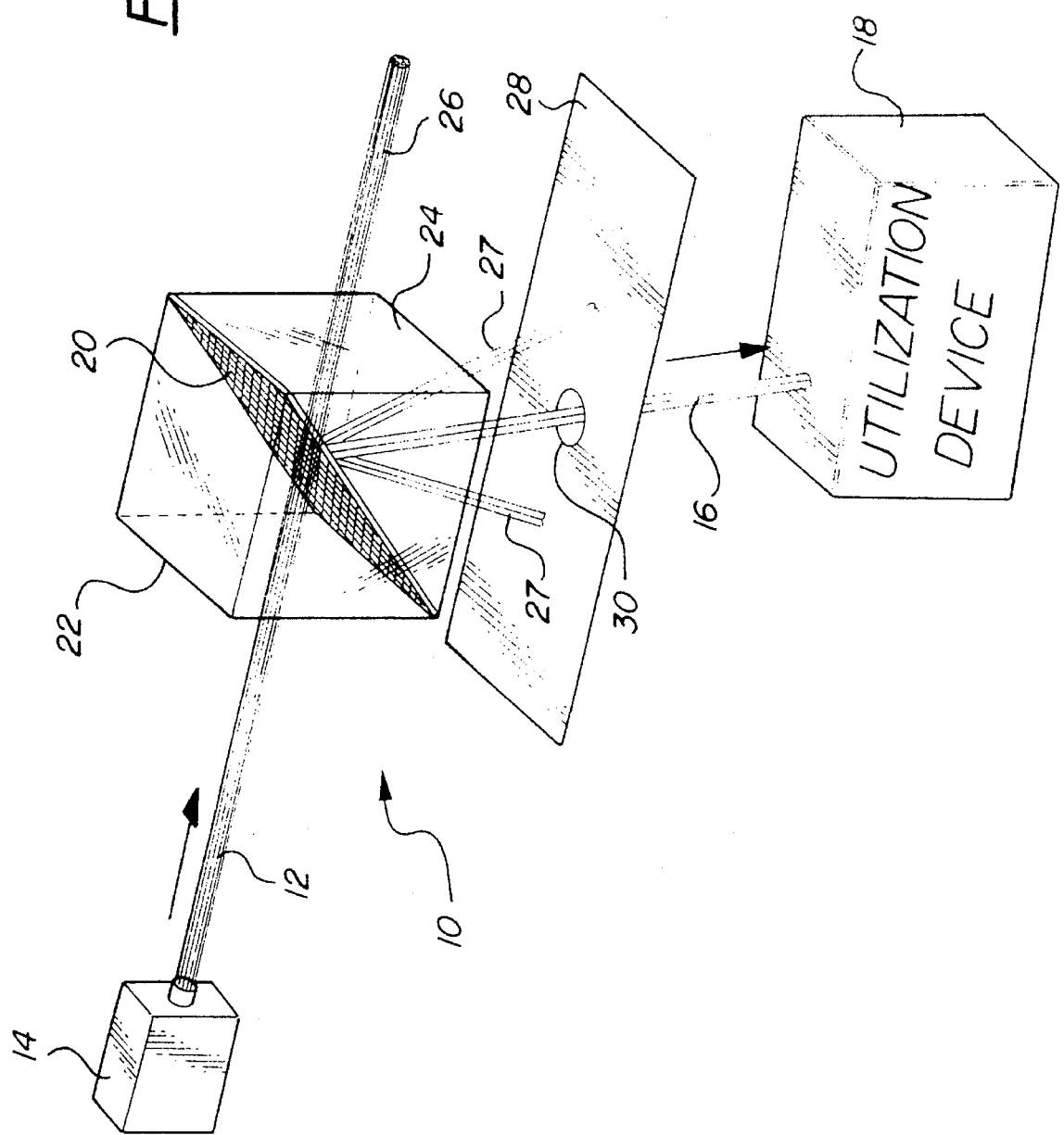
FIG. 1 is a perspective, partially schematic illustration of a preferred embodiment of the present invention comprising a bandpass filter employing a dispersive grating formed of a transmission holographic optical element.

Referring to FIG. 1, the preferred embodiment of the invention takes the form of a bandpass filter generally indicated at 10 which is adapted to receive a light beam 12 from a laser 14 and to filter the light so as to remove wavelengths which deviate from a desired emission line of the laser, to output an ultra pure light beam 16 for input to a suitable utilization device 18. The utilization device may constitute any optical system which will benefit from an ultra pure input beam such as a Raman spectrometer.

The filter 10 makes use of the wavelength sensitive dispersive power of a diffraction grating 20 that is a transmission holographic optical element (HOE). The HOE 20 is formed in a manner, which will subsequently be described in detail, so as to create a spatial fringe array of suitable spacing so that a desired output line of the laser 14, as contained in the incoming beam 12, is diffracted by about 90° when the incoming beam is incident upon the grating 20 at an angle of about 45°. To achieve this diffraction angle and maximize the dispersive effects of the grating, the grating 20 is sandwiched between the two oblique faces of a pair of right angle glass prisms 22 and 24. The position of the filter 20 relative to the laser 14 is arranged so that the incoming beam 12 enters a face of the prism 22 substantially perpendicularly and thus intersects the grating 20 at substantially 45°. The grating will diffract light of the desired laser line frequency through substantially 90° to produce an output beam 16 which exits the filter 10 substantially normal to a face of the prism 24. Wavelengths which deviate from the primary line of the laser are either transmitted unaffected through the grating, as light beam 26, or are diffracted at different angles than the laser line 16, as a function of their frequency, illustrated as beams 27.

The diffracted wavelengths are then passed through a spatial filter consisting of a mask 28 with a central aperture 30 positioned to pass the primary laser line 16 and block the unwanted side bands 27.

The bandpass filter 10 is compact, rugged and low in cost and has transmission efficiency for the primary laser line in excess of 90%. This is approximately twice the transmission efficiency of dielectric filters which are conventionally used to filter laser beams and allows the use of relatively small lasers in systems to achieve the same performance as systems employing larger lasers and dielectric filters.

Although the right angle prisms are not essential to the operation of the filter, they provide for an angle of incidence to the grating of 45 degrees inside the medium of the grating and its supporting substrate. Without the prisms, the 45 degree incidence angle would be outside the medium, and inside the grating the angle would be only about 28 degrees. The higher angle of incidence inside the grating allows the grating lines to have a higher spatial frequency, and the grating is therefor more dispersive, diffracting a given range of wavelengths through a greater range of angles than a grating with lines at a lower spatial frequency. The greater dispersion allows the filter pass band to be narrower or, alternatively, allows the spacing to the aperture mask to be less for a given pass band, making the filter configuration more compact.

In the preferred embodiment illustrated in FIG. 1, the output beam is perpendicular to the input beam. This arrangement is useful in those applications where the beam is folded by a mirror or prism through an angle of 90 degrees, as the bandpass filter can be substituted for the folding element, thereby eliminating the need for realigning the laser beam as well as saving the expense of the folding mirror or prism.

It should be noted that in some cases the entrance aperture or entrance pupil of utilization device 18 can serve as the aperture 30 in the aperture mask 28, thereby eliminating the need for a separate aperture mask element. In these cases, the unwanted wavelengths 27 are separated from the beam 16 because they fail to enter the aperture of the utilization device optics.

An alternative embodiment of the invention, illustrated in FIG. 2, passes an incoming light beam 40, generated by a laser 42, sequentially through two diffraction gratings, 44 and 46, formed by transmission holographic optical elements, and then through a spatial filter 48, to form an ultra pure output light beam 50 for provision to a utilization device 52.

The first HOE grating 44 is sandwiched between the mating, oblique faces of a pair of right angle glass prisms 54 and 56. As in the embodiment of FIG. 1, the grating 44 has a line spacing that diffracts a beam which intersects it at 45° and which has the wavelength of the desired output line of the laser 42 through 90° and that either passes other wavelengths without diffraction or diffracts them at differing angles as a function of their deviation from the wavelength of the primary laser line. A larger right angle glass prism 61 is attached to the prisms 56 and 64 to redirect light diffracted by the grating 44 to the grating 46. The primary laser line, after being diffracted by the grating 44 to form an exit beam 58, undergoes total internal reflection at prism surface 60, disposed at 45° to the right angle face of the prism 56 and again at prism surface 62, so that it enters the right angle face of prism 64 which has the second grating 46 supported on its oblique face. An output, right angle prism 66 is fixed to the other face of the grating 46. The parallel opposed faces of the prisms 56 and 64 are either separated by a rectangular prism 65 of absorbing glass or opaque material, or are coated with an opaque, absorbing material.

The primary laser line 58, exiting from the diffraction grating 44, is thus reflected by the surfaces 60 and 62 the grating 46 which is incident at an angle of 45°. It is then diffracted through 90° to provide an ultra pure exit beam 50. This beam passes through an aperture 68 in the spatial filter 48.

The double diffraction increases the purity of the exit beam. The filter of FIG. 2 is advantageous in that the input and output beams are in-line and on-axis with respect to each other, and thus it can be added to a laser beam without requiring realignment of the beam. Alternatively, it can be retrofitted to replace conventional dielectric filters of lower transmission efficiency.

It should be noted that in some cases the entrance aperture or entrance pupil of utilization device 52 can serve as the aperture 68 in the aperture mask 48, thereby eliminating the need for a separate aperture mask element. In these cases, the unwanted wavelengths are separated from the beam 50 because they fail to enter the aperture of the utilization device optics.

A manner of forming the HOE gratings 20, 44 and 46 is illustrated in FIG. 3. A planar sheet of holographic film 70 of dichromated gelatin or of a photopolymer is exposed by two collimated coherent light beams 72 and 74. The beam 72 makes an angle of $\theta_O$ with respect to the plane of the film 70 while the beam 74 makes an angle of $\theta_R$. Preferably the two angles $\theta_O$ and $\theta_R$ have the same magnitude so that the fringe planes are perpendicular to the plane of the holographic film 70. The angles are chosen to provide interference fringes having a spatial frequency which efficiently diffracts the wavelength of light that is to be passed by the filter through 90 degrees. The two beams 72 and 74 are preferably derived from a laser (not shown) through use of a beam splitter (not shown).

Having thus described my invention, I claim:

1. A transmission bandpass filter for an incident laser beam having a nominal wavelength, said filter being adapted to transmit elements of the beam having the nominal wavelength and reject beam elements of differing wavelengths comprising;

a substantially planar holographic optical element dispersion grating having first and second sides, adapted to be supported in a stationary manner relative to the incident laser beam so that the laser beam intersects said first side at an angle thereto so as to disperse the various wavelengths of the incident laser beam through angles which are a function of their wavelength; and an apertured mask supported in relation to said second side of said holographic optical element so that the dispersed light is incident on the mask and light of the nominal wavelength passes through the aperture in a straight-line path from said grating to form an exit beam of narrowband light and dispersed light of a wavelength differing from said nominal wavelength is blocked by said mask.

2. The transmission bandpass filter of claim 1, wherein said holographic optical element is supported between the faces of a pair of transparent prisms.

3. The transmission bandpass filter of claim 2, wherein said pair of prisms are each right angle prisms, and said holographic optical element is embedded between the oblique faces of the pair of prisms.

4. The transmission bandpass filter of claim 2, wherein said filter is positioned relative to the incident beam so that the beam is substantially perpendicular to one of the faces of one of the prisms, and the grating has a spatial frequency that diffracts said nominal wavelength through a predetermined angle so that the output beam exits substantially perpendicular to a face of the other prism.

5. A bandpass filter adapted to receive an incoming light beam along a first optical axis comprising:

a first diffraction grating formed of a transmission holographic optical element having a fringe spacing adapted to diffract the pass-band of the filter, supported obliquely to said first axis so that the incoming beam intersects the first grating;

a second diffraction grating formed of a transmission holographic optical element having a fringe spacing adapted to diffract the pass-band of the filter supported with respect to the first grating so that the pass-band diffracted by the first grating obliquely intersects the second grating and is diffracted thereby to produce an exit beam; and a spatial filter comprising a mask having an aperture, supported in the path of the exiting beam so that the light of the pass-band passes through the aperture and light of other wavelengths is blocked by the mask.

6. The bandpass filter of claim 5 including prism means adapted to direct pass-band light diffracted by the first grating to the second grating.

7. The bandpass filter of claim 5 wherein the first grating is sandwiched between the oblique faces of the pair of right angle glass prisms and the second grating is sandwiched between the oblique faces of a second pair of right angle glass prisms.

8. A transmission bandpass filter for a beam of incident laser light from a source having a nominal wavelength, said filter being adapted to transmit elements of the beam having the nominal wavelength and reject beam elements of differing wavelengths, comprising:

a substantially planar holographic optical element dispersion grating having first and second sides, adapted to be supported in a stationary manner relative to the incident laser beam so that the beam intersects said first side directly from the source at an angle thereto so as to disperse the various wavelengths of the incident beam through angles which are a function of their wavelength; and an apertured mask supported in relation to said second side of said holographic optical element so that the dispersed light is incident on the mask and light of the nominal wavelength passes through the aperture to form an exit beam of narrowband light and dispersed light of a wavelength differing from said nominal wavelength is blocked by said mask.

9. The transmission bandpass filter of claim 8, wherein said holographic optical element is supported between the faces of a pair of transparent prisms.

10. The transmission bandpass filter of claim 9, wherein said pair of prisms are each right angle prisms, and said holographic optical element is embedded between the oblique faces of the pair of prisms.

11. The transmission bandpass filter of claim 9, wherein said filter is positioned relative to the incident beam so that the beam is substantially perpendicular to one of the faces of one of the prisms, and the grating has a spatial frequency that diffracts said nominal wavelength through a predetermined angle so that the output beam exits substantially perpendicular to a face of the other prism.

12. A transmission bandpass filter for a beam of incident laser light having a nominal wavelength, said filter being adapted to transmit elements of the beam having the nominal wavelength and reject beam elements of differing wavelengths, comprising:

a substantially planar holographic optical element dispersion grating having first and second sides, said holographic optical element being supported between the faces of a pair of transparent prisms and positioned relative to the incident laser beam so that the beam is substantially perpendicular to one of the right angle faces of one of the prisms, said incident beam intersecting said first side of said grating at an angle thereto so as to disperse the various wavelengths of the incident beam through angles which are a function of their wavelength, with light of said nominal wavelength being diffracted so as to emerge substantially perpendicular to a right angle face of the other prism; and an apertured mask supported so that the dispersed light is incident on the mask and light of the nominal wavelength passes through the aperture to form an exit beam of narrowband light and dispersed light of a wavelength differing from said nominal wavelength is blocked by said mask.

\* \* \* \* \*